United States Patent [19]

Laverick

[11] Patent Number: 5,421,232
[45] Date of Patent: Jun. 6, 1995

[54] RECIPROCATING SAW

[75] Inventor: Raymond R. Laverick, Co. Durham, United Kingdom

[73] Assignee: Black & Decker Inc., Newark, Del.

[21] Appl. No.: 126,818

[22] Filed: Sep. 24, 1993

[30] Foreign Application Priority Data

Sep. 26, 1992 [GB] United Kingdom ............... 9220375

[51] Int. Cl.⁶ .................................................. B23D 51/10
[52] U.S. Cl. .................................. 83/699.21; 30/394
[58] Field of Search ............... 83/699.21; 30/524, 392, 30/394; 270/58, 60

[56] References Cited

U.S. PATENT DOCUMENTS

| 662,535 | 11/1900 | Jenkins | 279/60 |
|---|---|---|---|
| 938,995 | 11/1909 | Evans | 279/60 |
| 2,072,298 | 3/1937 | Fitzsimmons | 279/58 |
| 2,540,329 | 2/1951 | Gray . | |
| 2,639,737 | 5/1953 | Forsberg | 83/699.21 |
| 2,906,304 | 9/1959 | Levine | 83/699.21 |
| 3,260,289 | 7/1966 | Whitten, Jr. | 83/699.21 |
| 4,020,555 | 5/1977 | Hedrick . | |
| 4,204,692 | 5/1980 | Hoffman . | |
| 4,528,753 | 7/1985 | Kuhlmann et al. . | |
| 4,550,500 | 11/1985 | Kuhlmann et al. . | |
| 5,165,173 | 12/1992 | Miller . | |

FOREIGN PATENT DOCUMENTS

| 2500788 | 12/1975 | Germany . |
|---|---|---|
| 3006299 | 8/1981 | Germany . |
| 4102011 | 12/1991 | Germany . |
| 1484393 | 9/1977 | United Kingdom . |
| 2069406 | 8/1981 | United Kingdom . |
| 2158393 | 11/1985 | United Kingdom . |

Primary Examiner—Kenneth E. Peterson
Attorney, Agent, or Firm—Dennis A. Dearing; John D. Del Ponti; Charles E. Yocum

[57] ABSTRACT

A reciprocating saw is provided with a blade-clamping arrangement having the blade clamped by its thin edges between a pair of wedge-shaped jaws carried in a tapered sleeve at the end of the reciprocating drive shaft of the saw, the clamping of the jaws being effected by turning a non-reciprocating knob carried on the head of a saw and the knob being operably connected to the clamping jaws by a two-part stem of which the two-parts are mutually reciprocable whilst being restrained so that they can only be rotated as a unit.

15 Claims, 2 Drawing Sheets

RECIPROCATING SAW

BACKGROUND OF THE INVENTION

The present invention relates to a reciprocating saw having a blade clamping arrangement which can be operated without the use of a separate tool.

It has been common practice to clamp the blade of a reciprocating saw such as a jigsaw by securing the blade by one or two screws clamping the side of the blade in a slotted carrier located at the end of a reciprocating drive shaft.

In WO 89/08524, a jigsaw is described and claimed wherein a blade provided with lugs at one end is engaged in a bayonet fitting carried on the end of the reciprocating drive shaft, the blade being inserted into the bayonet fitting and turned so that the lugs on the blade are engaged in retention grooves provided in the bayonet fitting.

It is an object of the present invention to provide a jigsaw in which the blade can be clamped without the use of a separate tool and without twisting the blade.

SHORT DESCRIPTION OF THE INVENTION

According to the present invention, a reciprocating saw is provided with a blade-clamping arrangement characterised in that the blade is clamped between a pair of wedge-shaped jaws carried in a tapered sleeve at the end of the reciprocating drive shaft of the saw, the clamping of the jaws being effected by turning a non-reciprocating knob carried on the head of the saw and the knob being operably connected to the clamping jaws by a two-part stem of which the two-parts are mutually reciprocable whilst being restrained so that they can only be rotated as a unit.

During operation the knob and its actuating stem are held in a fixed position in the jigsaw housing and the blade-clamp is reciprocated by the jigsaw drive.

Preferably the blade is clamped between the jaws by its thin edges thereby giving substantially linear contact.

SHORT DESCRIPTION OF THE DRAWINGS

In order that the invention be better understood, a preferred embodiment will now be described in greater detail by way of example with reference to the accompanying drawings in which.

DETAILED DESCRIPTION OF THE PREFERRED EMBODIMENT AND DRAWINGS

Figure 1:
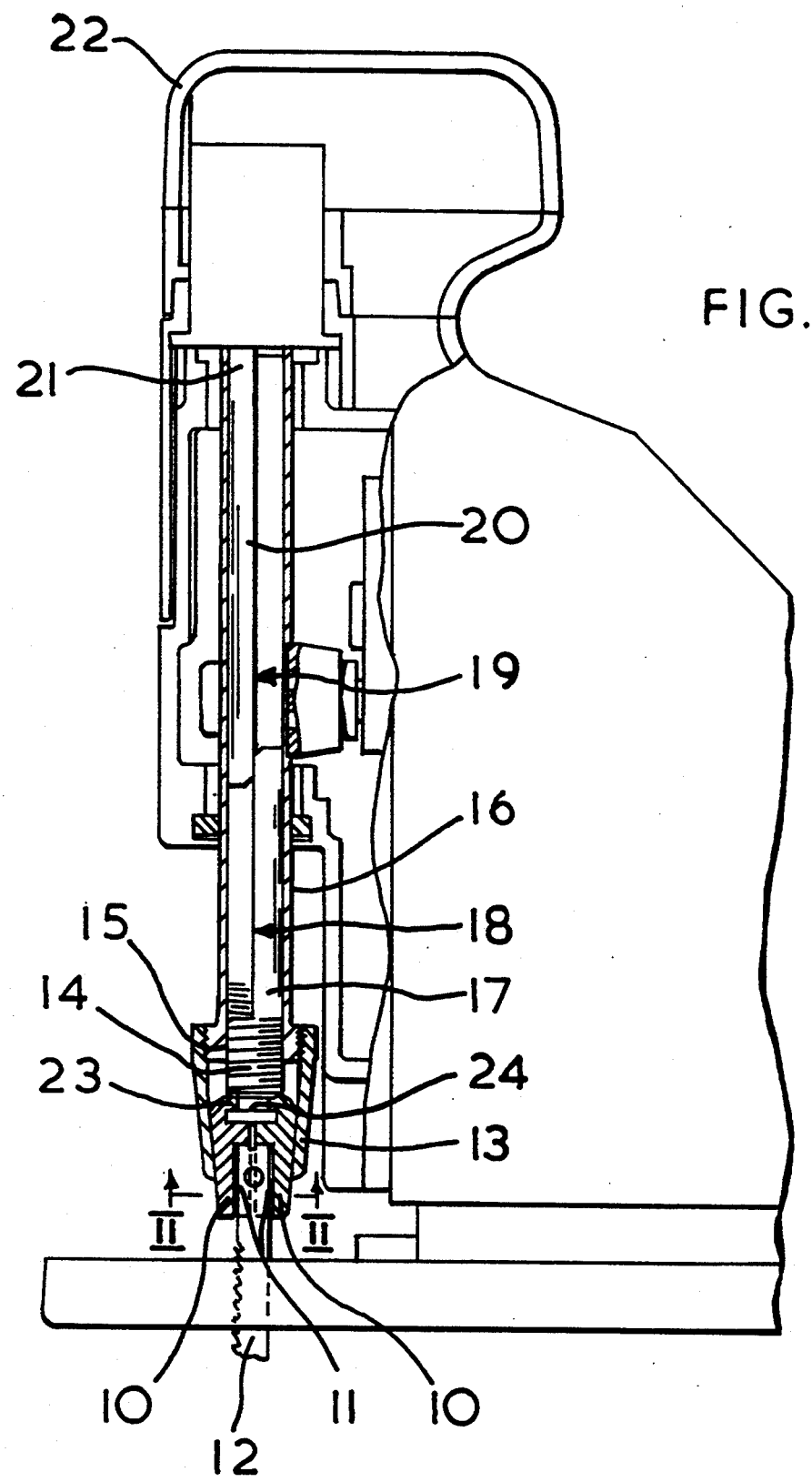
FIG. 1 is a partial section of the head of a jigsaw including the present invention.

In the drawings, a pair of wedge jaws (10) which are arranged and adapted to engage the edges (11) of a jigsaw blade (12) and cooperate with tapered sleeve (13) to clamp blade (12) between the jaws (10). The jaws (10) can be urged forward by a threaded actuating rod (14) which engages an internal thread (15) in the reciprocating drive shaft (16) of the saw. The actuator is extended by a D-section stem (17) the flat face (18) of which engages the flat face (19) of the overlapping D-section portion (20) of a control shaft (21). The control shaft (21) can be rotated by means of a rotatable knob (22) which incorporates a torque-limiting device (not shown).

Each jaw (10) is arranged so that a projection (23) interlocks with an undercut groove (24) formed in the end of actuating rod (14) so that the jaws (10) are positively withdrawn when the actuating rod (14) is withdrawn, thus readily releasing the clamping action of the jaws (10) on the jigsaw blade (12).

To operate the clamping arrangement, the end of the jigsaw blade (12) is inserted between jaws (10) which are then moved together by rotating the knob (22) to turn control shaft (21) which in turn rotates actuating rod (14) so that it screws into tapered sleeve (13) and, in urging the wedge-shaped jaws (10) into the tapered sleeve (13), provides clamping pressure across the edges (11) of blade (12). The torque-control device is adjusted to slip when a desired clamping load is exerted across blade (12).

When the jigsaw is operating, the respective D-sections of the control shaft (21) and of the actuating rod (14) reciprocate mutually, so that the control shaft (21) remains stationary whilst remaining in operable (rotatable) engagement with the actuating rod (14).

To disengage the clamp, knob 22 is rotated so that threaded actuating rod (14) is withdrawn when rotated by control shaft (21) so that jaws (10) are withdrawn from tapered sleeve whereby the blade is released.

Figure 2:
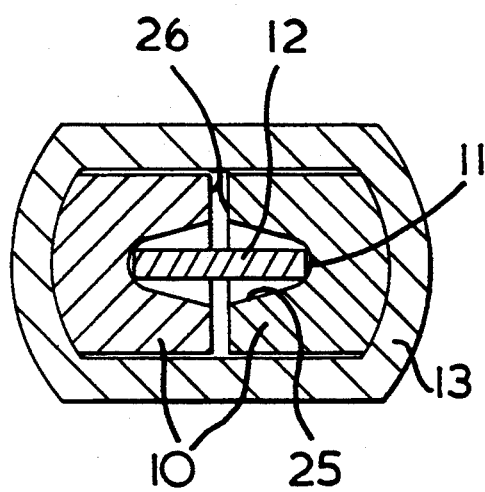
FIG. 2 is an enlarged section on line II—II of FIG. 1, showing a thin (1 mm) jigsaw blade held by the clamping jaws.
Figure 4:
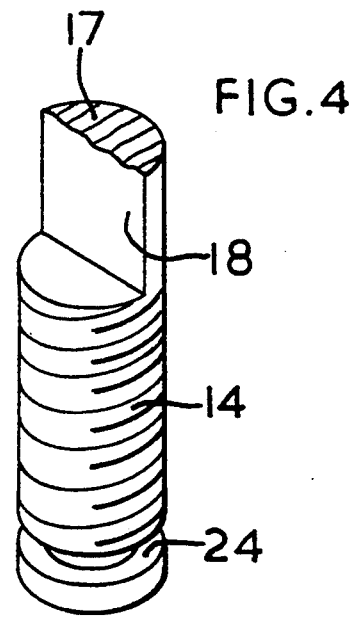
FIG. 4 is a perspective view, on an intermediate scale, of part of the actuating rod.
Figure 3:
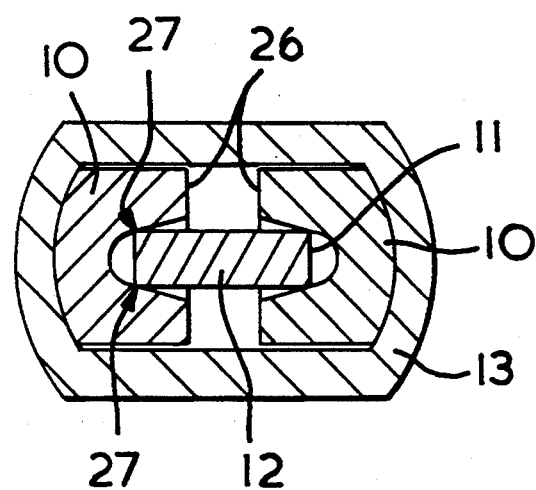
FIG. 3 is also an enlarged section on line II—II of FIG. 1, showing a thick (2 mm) blade held by the clamping jaws.
Figure 5:
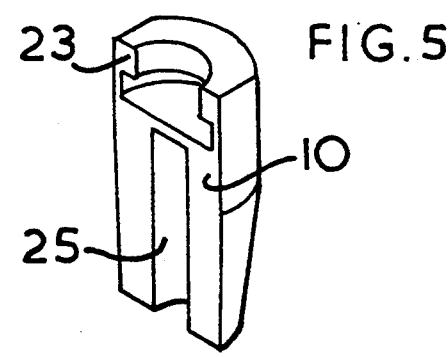
FIG. 5 is a perspective view, on the same scale as FIG. 4, of a clamping jaw.
Figure 6:
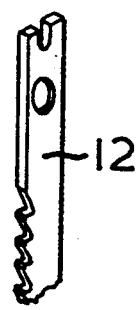
FIG. 6 is a perspective view, again on the same scale as FIG. 4, of the upper portion of a saw blade.

The edges (11) of blade (12) engage profiled grooves (25) formed axially across the centre of the contact face (26) of each jaw (10). This facilitates the accommodation of blades of varying thicknesses. FIG. 2 illustrates the clamping of a 1 mm thick blade and FIG. 3 illustrates the clamping of a 2 mm thick blade. It can be seen that the profiled grooves (25) in the jaws (10) engage the corners (27) of the edges (11) of the blade (12) to be clamped.

The arrangement of the present invention can be used with jigsaw blades having shaped ends such as the blades required for use in WO 89/08524 which are provided with shoulders or lugs which engage the retention grooves provided in the bayonet fitting.

I claim:

1. A reciprocating saw comprising
   a blade clamping arrangement wherein a blade is clamped between a pair of wedging jaws carried in a tapered sleeve at an end of a reciprocating drive shaft of the saw;
   the clamping of the jaws being effected by turning a non-reciprocating knob carried on a head of the saw; and
   the knob being operably connected to the jaws by a two-part stem of which the two stem parts are mutually reciprocable while being restrained so that the two stem parts can only be rotated as a unit.

2. A reciprocating saw according to claim 1, wherein the blade has thin edges and is clamped between the jaws by the edges thereby giving substantially linear contact.

3. A reciprocating saw according to claim 1 or 2, wherein the knob is provided with a torque-limiting device.

4. A reciprocating saw according to claim 1 or 2, wherein one stem part is a threaded actuating rod that engages an internal thread in the reciprocating drive shaft of the saw.

5. A reciprocating saw according to claim 1 or 2, wherein each jaw has a projection interlocked with an undercut groove formed in an end of the actuating rod so that the jaws are positively withdrawn when the actuating rod is withdrawn.

6. A reciprocating saw according to claim 1 or 2, wherein each jaw is formed with a tapered groove extending along a contact face of the jaw whereby the jaws engage corners of edges of the blade to be clamped.

7. A reciprocating saw comprising:
 a reciprocatable tubular drive shaft;
 a tapered sleeve connected to one end of the drive shaft;
 a nonreciprocatable, rotatable control shaft within the drive shaft;
 an actuating rod within and threadedly connected to the drive shaft and rotatable with and reciprocatable relative to the control shaft; and
 a pair of jaws for engaging a saw blade, located within the tapered sleeve, operably connected to the actuating rod and opened and closed by rotation of the control shaft and the actuating rod.

8. The reciprocating saw of claim 7 further comprising a nonreciprocatable knob rotatably connected to the control shaft.

9. The reciprocating saw of claim 7 wherein the control shaft and rod reciprocate mutually while remaining rotatably engaged.

10. The reciprocating saw of claim 9 wherein the knob is torque limited.

11. The reciprocating saw of claim 7 wherein:
 the rod comprises an undercut groove; and
 the jaws comprise projections interlocked in the undercut groove.

12. The reciprocating saw of claim 7 wherein the control shaft and the actuating rod each comprise a D-shaped cross-section permitting conjoint rotation and mutual reciprocation.

13. The reciprocating saw of claim 7 wherein the blade has thin edges and the jaws clamp the saw blade by the thin blade edges.

14. The reciprocating saw of claim 13 wherein each jaw comprises a contact face and a tapered groove formed in each contact face.

15. The reciprocating saw of claim 14 wherein the tapered grooves engage corners of the thin blade edges.

* * * * *